Jan. 15, 1952     F. C. WILLIAMS ET AL     2,582,894

WIRELESS BEACON SYSTEM

Filed Aug. 5, 1947

F. C. Williams
N. F. Moody
Inventor

By *(signature)*
Attorney

Patented Jan. 15, 1952

2,582,894

UNITED STATES PATENT OFFICE 2,582,894

WIRELESS BEACON SYSTEM

Frederic Calland Williams, Timperley, and
Norman F. Moody, Cuffley, England

Application August 5, 1947, Serial No. 766,428
In Great Britain July 26, 1945

Section 1, Public Law 690, August 8, 1946
Patent expires July 26, 1965

8 Claims. (Cl. 343—107)

The present invention relates to wireless signalling systems and is more particularly, although not exclusively, concerned with arrangements for aiding the navigation of mobile craft such as aircraft or shipping.

A number of systems have been proposed for this purpose some of which employ continuous-wave transmission from a ground station or beacon while others employ pulse transmission. Where pulse transmission is employed it is usually necessary to provide, at the ground beacon station, a number of widely spaced aerials. Receiving equipment in the mobile craft then determines the bearing with respect to the ground beacon station, for instance, by comparing the difference in transit time of the pulses from the spaced aerials or by the change in phase of the pulses with respect to a reference phase.

The object of the present invention is to provide an arrangement which is applicable to both continuous-wave transmission and to pulse transmission and which avoids the use of widely spaced aerials.

A wireless signalling system according to the broadest aspect of the invention includes a transmitting station from which omnidirectional transmission is arranged to take place continuously with additional directional transmission superposed thereupon discontinuously in such a manner that the amplitude of the signal at a distant receiving station varies discontinuously to an extent dependent on the bearing of said receiving station with reference to the transmitting station.

According to a particular aspect of the invention, applied to aiding the navigation of a mobile craft, a fixed beacon transmitting station located at a known geographical position is arranged so that omnidirectional transmission takes place continuously therefrom with directional transmission superposed thereupon discontinuously in such a manner that the amplitude of the signal at a receiving station in the mobile craft varies discontinuously to an extent dependent upon the bearing of such craft with reference to the beacon station.

According to one embodiment of the invention, two directional transmissions having their maxima orienated in different bearing directions are arranged to be superposed on said omnidirectional transmission separately and repeatedly in cyclic manner. Desirably, each of the directional transmissions is arranged to have a "figure-of-eight" horizontal polar diagram while their respective maxima are disposed at right angles.

Thus in one practical embodiment of ground beacon transmitter according to the invention an omnidirectional aerial is continuously energised by a radio transmitter and two directional aerial arrangements are provided, also energised by said transmitter, and arranged so that their radiation polar diagrams are at right angles.

According to a further feature of the invention, the directional aerial arrangements are such that the horizontal polar diagram thereof has two lobes extending in opposite directions from the aerial arrangement, the phase of the signals transmitted in one direction being opposite to that transmitted in the other direction.

In order that the various features of the invention may be more readily understood one embodiment thereof will now be particularly described with reference to the accompanying drawings in which.

Figures 1, 2:
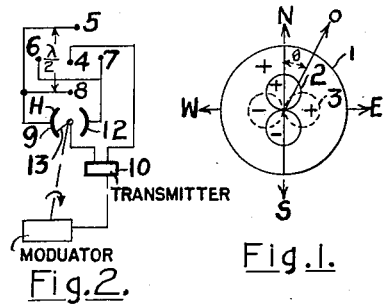
Figure 1 shows graphical representations or polar diagrams of the horizontal radiation characteristics of one form of ground beacon transmitter and Figure 2 is a diagrammatic drawing of the aerial system at such ground beacon transmitter.

Referring first to Figure 1 the ground beacon transmitter comprises and an omni-directional aerial system having a horizontal polar diagram as indicated at I and two further directional aerial systems each having a so-called "figure of eight" horizontal polar diagram and disposed so that their respective polar diagrams lie at right-angles to one another as shown at 2 and 3. Desirably the directional aerial arrangements are such that the phase of the signals transmitted in one lobe of each of the related polar diagrams is opposite to that in the other lobe as shown by the + and — signs but is in-phase with the signal from the omnidirectional aerial 4.

One aerial system suitable for providing a configuration of polar diagrams as referred to above, is shown in Figure 2 in which the omni-directional aerial 4 is located at the centre of a square with further aerials 5, 6, 7 and 8 disposed respectively at the four corners of such square. Each of the aerials conveniently comprises a vertical centre-fed dipole while the length of the diagonals of the square is approximately λ/2, λ being the wavelength of transmission.

The aerials at opposite corners are connected in pairs to a suitable switch 9 having two diametrically opposed contact segments, 11, 12 each extending for 90° of the rotary travel of a moving contact arm 13. The latter, together with the omni-directional aerial 4 is connected to a transmitter 10. It will be understood that the various feeder lines connecting the transmitter 10 to the aerial 4 and, by way of switch 9, to aerials 5, 6, 7 and 8, are so dimensioned that R. F. energy reaches the aerials in the correct relative phase for the effects of the omni-directional and the directional systems to combine according to the phase order indicated by the symbols + and − in the polar diagram patterns of Figure 1. For example, assuming aerials 4, 5 and 8 are in simultaneous operation to provide the two full line polar diagrams of Figure 1, then the R. F. energy reaching aerial 5 will be lagging by a phase angle of 90° with respect to the R. F. energy at aerial 4 whereas the R. F. energy at aerial 8 will be leading by a phase angle of 90° with respect to the energy at aerial 4.

The two directional aerial pairs 5, 8 and 6, 7 are desirably, but not essentially, so oriented that the resultant maxima of their polar diagrams are directed north-south and east-west as shown. The switch 9 is arranged to be rotated continuously at a steady rate so that the following switching cycle is provided and repeated.

Period 1—Omni-directional transmission only from aerial 4.
Period 2—Omni-directional with superposed N—S directional from aerials 5 and 8.
Period 3—Omni-directional alone from aerial 4.
Period 4—Omni-directional with superposed E—W directional from aerials 6, 7.

Referring again to Figure 1, if reception of the transmissions from the aerial system is made from some position, e. g., in an aircraft, lying in the bearing direction O at an angle θ with the northerly direction line through the aerials 5 and 8, the effect of the super-position of the directional polar diagram 2 upon the omni-directional polar diagram 1 will be to cause an amplitude discontinuity to occur in the transmitted, and hence, in the received signal, the extent of the discontinuity being proportional to K cos θ where K is a constant dependent upon the ratio of the transmitter power supplied to the aerial 4 to that supplied to aerials 5 and 8.

Similarly, the superposition of the directional polar diagram 3 on the omni-directional polar diagram 1 will cause an amplitude discontinuity to occur, the extent of which will be proportional to K sin θ. The signal received at any point along the bearing direction will therefore be characterised by two amplitude discontinuities per cycle of aerial switching at the ground beacon and, by reception of such signals and the development of voltages proportional to the cos θ and sin θ values, an indication of the bearing angle θ may be provided.

Figure 3:
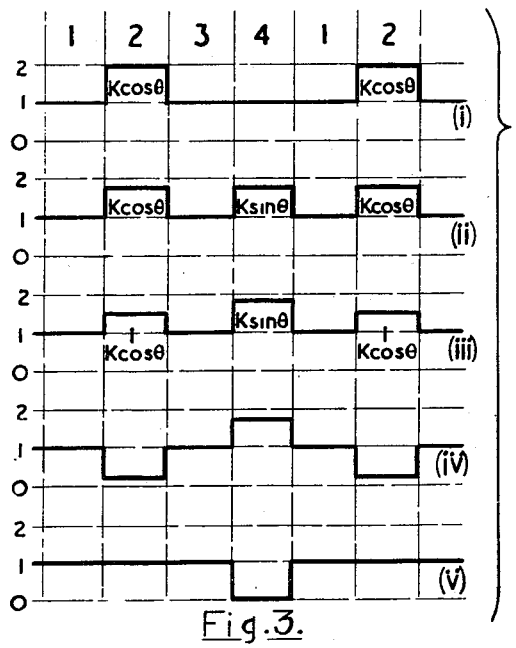
Figure 3 is a series of diagrams $i$ to $v$ showing graphically how the amplitude discontinuities vary with reception of the ground beacon signals at different bearing angles there-around.

Figure 3 shows a number of representative examples of the received signal amplitude at different bearing angles θ. The constant K in this instance is made equal to unity for simplicity. Diagram i is for a bearing angle of 0°, i. e., due north. Here the signal amplitude is doubled during switching period 2 but is unaffected during period 4. Diagram ii corresponds to a bearing angle of 45° i. e., N. E. The signal amplitude during period 2 is increased by the factor 0.707 and is similarly increased during period 4. In diagram iii the bearing angle θ has increased to 60°, with resultant smaller increase during switching period 2 and greater increase during switching period 4. Diagram iv shows the condition for a bearing angle θ of 135°. In this instance, on account of the effect of the opposite phase lobe of polar diagram 2, period 2 is marked by a decrease in the received signal amplitude. Period 4 is still characterised by increased amplitude. Diagram v shows the conditions for an angle θ of 270°. Here period 2 shows no discontinuity of amplitude whereas period 4 shows a reduction of amplitude to zero level.

Figure 4:
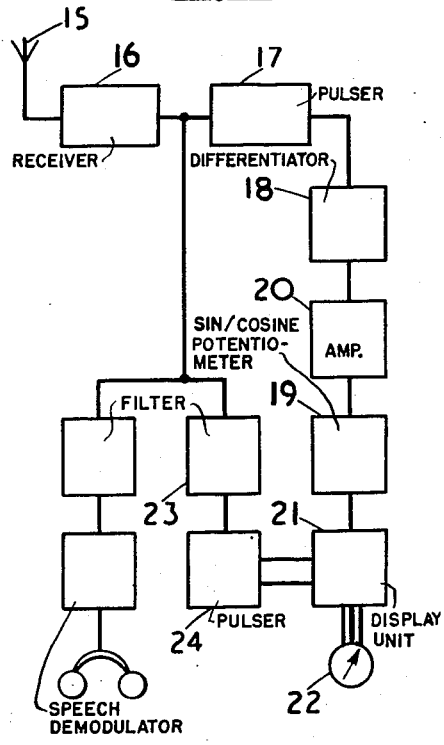
Figure 4 is a schematic block diagram of one form of receiving apparatus for use in a mobile craft in association with the beacon transmitter of Figures 1 and 2 and Fig. 5 is a series of wave form diagrams illustrating the operation of the apparatus of Figure 4.

Referring now to Figure 4, which shows one suitable receiving apparatus arrangement for use in a mobile craft, signals received by an aerial 15, preferably one having an omnidirectional characteristic, are applied to a suitable receiver 16 whose rectified signal output is fed to a circuit 17 which delivers a square pulse waveform, resembling generally the form shown in the diagrams of Figure 3, i. e., having amplitude discontinuities proportional in value to the cos θ and sin θ values and equal in duration to the received signal discontinuity period. This output waveform from unit 17 is applied to a differentiating circuit 18 with the resultant generation of both positive- and negative-going pulses for each discontinuity period, the differentiated pulse amplitudes being still proportional to the aforesaid cos θ and sin θ values. This differentiated pulse waveform, shown by way of example in diagram i, Figure 5, as corresponding to diagram iii, Figure 3, is then applied to a sin/cosine potentiometer unit 19, preferably after amplification in linear amplifier unit 20.

Figure 5:
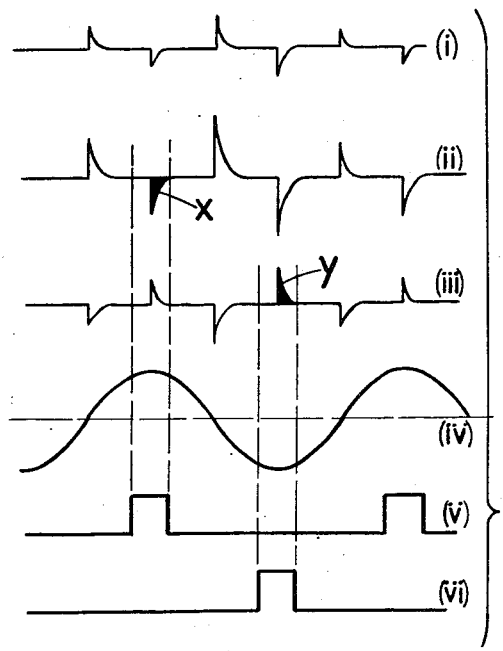

The sin/cos potentiometer 19 may be of the type shown in Figure 5 of U. S. Patent 2,490,394, granted December 6, 1949, and entitled Wireless Signalling Systems. A brief description of this sin/cos potentiometer is found in the next paragraph.

The sin/cosine potentiometer is arranged to provide two outputs, each derived from the differentiated input signal but proportional respectively to the cos φ and the −sin φ values of the setting angle φ of the control shaft of the potentiometer with reference to a certain zero position. The sine/cosine potentiometer may comprise a resistance toroid which is fed at opposite ends of a diameter with equal and opposite signals from a center tap transformer. The sine and cosine pick-off arms are arranged at ninety degrees to each other. The outputs for a given setting will then be very nearly proportional to the sine and cosine of the angle between the input position and the nearest point of contact at the said setting. In any case the potentiometer may be calibrated easily in degrees to give the required sine/cosine output for any angle. These two outputs, which are illustrated in diagrams ii and iii, Figure 5, are applied to a display unit 21 in which one of the differentiated pulses related to one aerial switching period is selected from one waveform e. g., pulse x in diagram ii, Figure 5, and one of the differentiated pulses related to the other aerial switching period from the other waveform, e. g., pulse y, diagram iii, Figure 5. These selected pulses are applied to a centre-zero meter device 22 which is arranged to integrate the applied pulse signals, e. g., by a suitable shunting condenser network, and which reads zero when the applied pulses are of equal amplitude. Such equality occurs when $\phi$ (the angular setting of potentiometer control of unit 19) is equal to $\theta$. Hence the value of $\theta$ or more suitably, the reciprocal bearing angle of the ground beacon transmitter at the craft, $\theta+180°$, may be read off from a suitable calibration of the control means of the unit 19.

In order to effect the requisite selection of the chosen pulses some synchronising link with the aerial switching at the ground beacon station is necessary. This is conveniently provided by suitable modulation of the transmitted signal radiated from the omni-directional aerial 4 to provide a "reference wave." This modulation is resolved from the signal output of the receiver in a filter unit 23 which provides a "reference" sine wave whose frequency and phasing is accurately related to the rotation of aerial switch 9 at the ground beacon station. The upper and lower peaks of the sine wave shown in diagram iv, Figure 5, are arranged to trigger pulse generators such as 24 in known manner to produce the pulse switching wave forms shown in diagrams v and vi in Figure 5 for appropriate control of the display unit 21. Similar circuits are described in the prior co-pending application of F. C. Williams, S. N. 763,713, filed July 25, 1947, entitled Wireless Signaling Systems, now U. S. Patent 2,490,394, granted December 6, 1949.

Preferably a system of pulse transmission is employed at the ground beacon station, the transmitter 10 generating short R. F. pulses at a constant repetition frequency of, say, 5 kc./s. With the switch 9 running at 3000 R. P. M., groups of 25 pulses are radiated from each directional aerial in turn with, of course, a continuous radiation of the same pulse signals from the omni-directional aerial 4. Each pulse group is transmitted in 0.005 second and a complete switching sequence comprising the periods 1 to 4 already described lasts 0.02 second. A convenient R. F. carrier frequency is in the region of 200 mc./s. or it may be higher and the mean pulse width may be of the order of 1.5 microseconds. The "reference wave" for controlling the selection of the appropriate waveform pulses in the receiving apparatus is conveniently transmitted by width—modulating the pulses, or at least those radiated by the omni-directional aerial 4. Back-edge modulation is preferred. Further width modulation, by speech or Morse, may be applied for the purpose of providing a communication channel between the ground beacon and the mobile craft. In this case the receiver shown in Fig. 4 may include a filter 25 and a speech demodulator 26 feeding earphones 27.

We claim:

1. A wireless beacon comprising an omnidirectional transmitter arranged to transmit continuously, two directional transmitters each having a figure-of-eight horizontal polar diagram of which the maximum directions are substantially perpendicular, switching means for energizing said directional transmitters separately and repeatedly in cyclic manner, said switching means being so timed that the periods of superposed directional and omnidirectional transmission are of substantially equal time duration and are interspaced by similar periods of omnidirection transmission alone.

2. A beacon according to claim 1 and in which the aerials of the said omnidirectional and directional transmitter include feeding means for energizing them by currents phased so that the signals transmitted in one lobe of each of the said directional transmitters is opposite to that of the signals in the other lobe but in phase with the signals from the said omnidirectional transmitter.

3. A wireless beacon comprising an omnidirectional radiator, a plurality of fixed directional radiators each including means which radiate in opposite directions away from and along lines intersecting the omnidirectional radiator, said directional radiators being disposed to radiate at different horizontal angles, transmitter means for energizing all of said radiators, and switching means to control the flow of energy to said directional radiators including means to separately energize them in predetermined sequence with time intervals between each of the energizations of such sequence, said transmitter means including means to energize said omnidirectional radiator concurrently with each energization of a directional radiator as well as between energizations of directional radiators.

4. The combination with a wireless beacon as defined in claim 1 having in addition means controlled by the switching means for modulating the omnidirectional transmitter at a frequency that varies with the frequency of operation of the switching means.

5. The combination with a wireless beacon as defined in claim 1, of a remote receiver for receiving the radiations of all of said transmitters, and means responsive to the output of said receiver for comparing the amplitude of the waves reaching the receiver when the omnidirectional and the first directional transmitter are radiating concurrently with the amplitude of the waves reaching the receiver when the omnidirectional and the second directional transmitter are radiating concurrently.

6. A wireless beacon as defined in claim 1 having in addition means for modulating the radiations therefrom at a rate depending on the frequency of operation of said switching means, and a remote receiver for receiving the radiations from said wireless beacon, a meter responsive to the differential of two inputs thereto, and means responsive to modulations received by said receiver for shifting the output of the latter between said inputs so that one such input is energized when the omnidirectional and the first directional transmitters are concurrently radiating and the other such input is energized when the omnidirectional and the second directional transmitter are concurrently radiating.

7. In combination; a wireless beacon comprising an omnidirectional antenna, a plurality of fixed directional antennas adjacent the first-named antenna and arranged to transmit in different fixed directions, means to energize the first-named antenna continuously and the others separately in a given sequence, said wireless beacon including means to radiate a modulated signal having a modulation frequency that depends on the frequency at which the directional antennas are energized; and a receiving and indicating system located remote from said beacon comprising a receiver for receiving radiations from all of said antennas, indicating means including a different circuit for each directional antenna, said indicating means including means for comparing the energizations of said circuits, and means energized by the receiver and responsive to the modulations of said modulated signal for shifting the output of the receiver to that circuit that is complementary to the directional antenna being energized at the time.

8. A wireless beacon as defined in claim 1 including in addition means for modulating the output of the omni-directional transmitter according to intelligence to be communicated, whereby a communication channel is established.

FREDERIC CALLAND WILLIAMS.
NORMAN F. MOODY.

REFERENCES CITED

The following references are of record in the file of this patent:

UNITED STATES PATENTS

| Number | Name | Date |
|---|---|---|
| 948,086 | Bellini et al. | Feb. 1, 1910 |
| 2,184,843 | Kramar | Dec. 26, 1939 |
| 2,248,752 | Goldman et al. | July 8, 1941 |
| 2,288,815 | Luck | July 7, 1942 |
| 2,309,068 | Hermansson | Jan. 19, 1943 |
| 2,310,079 | Hermansson | Feb. 2, 1943 |
| 2,311,837 | Kandoian | Feb. 23, 1943 |
| 2,314,795 | Luck | Mar. 23, 1943 |
| 2,328,476 | Luck | Aug. 31, 1943 |
| 2,414,431 | Alford et al. | Jan. 21, 1947 |
| 2,422,110 | Luck | June 10, 1947 |
| 2,463,286 | Kolster | Mar. 1, 1949 |

FOREIGN PATENTS

| Number | Country | Date |
|---|---|---|
| 467,013 | Great Britain | June 9, 1937 |
| 546,341 | Great Britain | July 8, 1942 |